United States Patent [19]

Iacovangelo et al.

[11] Patent Number: 5,372,681
[45] Date of Patent: Dec. 13, 1994

[54] PREPARATION OF MOLTEN SALT ELECTROLYTES CONTAINING DIVALENT TITANIUM

[75] Inventors: Charles D. Iacovangelo, Schenectady; Paul J. DiConza, Clifton Park, both of N.Y.

[73] Assignee: General Electric Company, Schenectady, N.Y.

[21] Appl. No.: 96,807

[22] Filed: Jul. 26, 1993

[51] Int. Cl.$^5$ ............................................. C25C 3/36
[52] U.S. Cl. ..................................... 204/71; 204/64 T
[58] Field of Search ................. 204/64 T, 71; 75/303, 75/308, 309

[56] References Cited

U.S. PATENT DOCUMENTS

| | | | |
|---|---|---|---|
| 2,741,588 | 4/1956 | Alpert et al. | 204/64 |
| 2,745,802 | 5/1956 | Schmidt | 204/64 T |
| 3,444,058 | 5/1969 | Mellors et al. | 204/71 |

OTHER PUBLICATIONS

C. Scordilis-Kelley et al., J. Electrochem. Soc. 139, "Alkali Metal Reduction Potentials Measured in Chloroaluminate Ambient-Temperature Molten Salts" (1992), pp. 694–698 (no month).
Alpert et al., J. Electrochem. Soc. 104, No. 9 (Sep. 1957), "Electrolytic Preparation of Titanium From Fused Salts", pp. 555–559.
Senderoff, Electrochemical Society, "Electrodeposition of Coherent Deposits of the Refractory Metals" in Modern Electroplating, pp. 473–474 (F. A. Lowenheim ed., 1974) (no month).
Stafford, J. Electrochem. Soc., 136, "The Electrodeposition of an Aluminum-Manganese Metallic Glass From Molten Salts", (1989), pp. 635–639.
Janowski et al., Metallurgical Trans. A, 23, "The Microstructure of Electrodeposited Titanium-Aluminum Alloys", pp. 2715–2723 (1992) Oct.

*Primary Examiner*—John Niebling
*Assistant Examiner*—Edna Wong
*Attorney, Agent, or Firm*—William H. Pittman

[57] ABSTRACT

Divalent titanium is prepared by the reduction of higher valence titanium halides in a molten salt electrolyte for subsequent titanium deposition with aluminum to form alloys exhibiting excellent mechanical properties for use at high temperatures. At least one aluminum halide such as $AlCl_3$ is combined with aluminum metal, at least one titanium halide such as $TiCl_3$ where the titanium has a valence greater than two, and at least one salt capable of forming a melt with said aluminum halide at temperatures up to about 250° C. to form a molten salt electrolyte. The salt may be an alkali, alkaline earth or organic halide. Upon heating in an inert atmosphere at a temperature greater than the melting point of the electrolyte, the higher valence titanium is reduced by aluminum metal to form divalent titanium. Titanium-aluminum alloys of up to 50 atomic percent titanium can then be deposited from the electrolyte.

20 Claims, No Drawings

PREPARATION OF MOLTEN SALT ELECTROLYTES CONTAINING DIVALENT TITANIUM

The present invention relates to the preparation of divalent titanium-containing compositions, and more particularly to the preparation of divalent titanium-containing electrolytes suitable for subsequent electrodeposition of titanium with aluminum to form titanium-aluminum alloys.

Titanium-aluminum alloys exhibit properties not attainable by homogeneous aluminum alloys such as excellent high temperature strength, hardness, and corrosion resistance. As the titanium content of such alloys increases, the mechanical properties necessary for high temperature applications improve. However, currently available processes for producing titanium-aluminum alloys such as plasma spraying or chemical vapor deposition are often cost prohibitive and provide inadequate control of the resulting alloy composition.

Electrodeposition of titanium-aluminum alloys is advantageous over the above-mentioned conventional methods of production. The temperature at the electrode/electrolyte interface can be controlled since the deposition is done isothermally, and uniform deposition onto the cathode is possible. In addition, control of the deposition rate determined by the applied current density allows the composition and resultant properties of the alloy to be precisely determined at any time during the plating process. Coatings with modulated or graded compositions providing specially tailored properties may thus be produced. Finally, temperatures lower than 250° C. may be employed when electrodeposition is from a molten salt electrolyte.

Applications of a low temperature coating process for titanium-aluminum alloys include the repair of machined surfaces of metal-matrix composites by recoating exposed reinforcement phases and the production of oxidation- and wear-resistant coatings for plastics and other heat-sensitive materials. Thus, a low temperature electrodeposition process for the formation of titanium-aluminum alloys is desirable.

Because titanium and aluminum are more chemically reactive than hydrogen, electrodeposition must proceed from nonaqueous electrolytic solutions lacking an acidic hydrogen. Aluminum chloride/sodium chloride molten salt electrolytes with a mole ratio of 2:1 AlCl$_3$:NaCl have been employed for electrodeposition of elemental aluminum at temperatures below 200° C. As the melt is made more acidic by increasing the concentration of AlCl$_3$, the concentration of the electroactive species Al$_2$Cl$_7^-$ increases, and the aluminum is reduced to elemental aluminum according to the following equation:

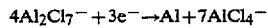

$$4Al_2Cl_7^- + 3e^- \rightarrow Al + 7AlCl_4^-$$

However, the quality of the deposition decreases with increased current density, and dendrite formation often occurs at current densities greater than 5 mA/cm$^2$.

Codeposition of titanium with aluminum from molten AlCl$_3$/NaCl mixtures at a wide range of current densities eliminates dendrite formation, producing dense nodular deposits. Critical to the electrodeposition of elemental titanium to produce alloys of suitable purity and concentration is the presence of divalent titanium in the electrolyte. Although three different valences of titanium are stable in solution, the presence of divalent titanium allows process control and optimum deposition. Thus, the amount of divalent titanium in the electrolyte must be maximized to achieve maximum titanium content in the resulting alloy.

Significant amounts of divalent titanium in the electrolyte can be achieved by the direct addition of titanium dichloride, but the compound is prohibitively expensive due to the difficulty of its isolation. Thus, the development of an inexpensive and efficient method for the introduction of divalent titanium into the electrolyte is critical to providing a commercially feasible low temperature process for the electrodeposition of titanium with aluminum to form alloy coatings.

Electrolytic preparation of titanium metal from molten chloride salt systems at temperatures typically around 700°-800° C. is known in the art, but such temperatures are incompatible for use with substrates such as plastics or graphite whiskers. Also, such work has been aimed at maximizing the production of elemental titanium from its salts as opposed to forming a metallurgical coating.

Alpert et al. disclose in U.S. Pat. No. 2,741,588 a high temperature process for electrolytically producing titanium metal from titanium tetrachloride. Titanium tetrachloride is introduced as either a liquid or a vapor into a molten alkali or alkaline earth chloride mixture at a cathode and is reduced for Ti$^{+4}$ to Ti$^{+3}$ and Ti$^{+2}$. In *J. Electrochem. Soc.*, 104, 555 (1957) Alpert et al. further report that the nature and purity of titanium metal deposited onto a second cathode depends on the degree of reduction of the melt as exhibited by the concentrations of titanium trichloride and titanium dichloride. The degree of reduction is expressed by an N value where N is the apparent valence of titanium in the electrolyte or the subscript in the empirical formula TiCl$_x$ for the titanium chlorides present. As N decreases toward 2 according to the reaction

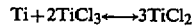

$$Ti + 2TiCl_3 \rightleftharpoons 3TiCl_2$$

the crystal size and purity of the deposit increases. In LiCl-KCl melts at 400°-500° C., N was found to be 2.0, increasing to 2.15 for NaCl or SrCl$_2$-NaCl melts at 700°-900° C. When most of the dissolved titanium was in the divalent state, high quality ductile crystals were deposited. When N was greater than 2.5 due to oxidation caused by air leakage while the titanium tetrachloride was being introduced, the deposit was powdery with as much as 90% by weight of fused salt.

Mellors et al. disclose in U.S. Pat. No. 3,444,058 a process for the electrodeposition of structurally coherent deposits of refractory metals consisting of zirconium, tantalum, columbium, chromium, hafnium, tungsten, molybdenum, vanadium or alloys thereof from a molten alkali-fluoride electrolyte also containing the fluoride of the metal to be deposited. Attempts to apply this process to titanium produced coatings of limited thickness, usually covered with dendrites. See S. Senderoff, Electrochemical Society, "Electrodeposition of Coherent Deposits of the Refractory Metals" in *Modern Electroplating*, 473 (F. A. Lowenheim ed., 1974).

Low temperature electrodeposition processes are described by Stafford in *J. Electrochem. Soc.*, 136, 635 (1989), whereby manganese-aluminum alloys are deposited from molten chloroaluminate salt systems such as AlCl$_3$/NaCl systems at temperatures below 200° C. Molten salt electrolytes containing MnCl$_2$ in a 2:1 mole ratio of AlCl₃:NaCl were observed to produce bright adherent Mn-Al alloy deposits. Alloy composition was found to be strongly dependent on manganese content in the electrolyte and also on current density.

Likewise, electrodeposition of titanium-aluminum alloys at temperatures below 250° C. from molten salt electrolytes containing AlCl₃:NaCl in a molar ratio of 2:1 and divalent titanium, $Ti^{+2}$, has been reported by (for example) Janowski et al. in *Metallurgical Trans. A*, 23, 2715-2723 (1992). Alloy composition was found to be dependent on the concentration of divalent titanium in the electrolyte. Addition of divalent titanium to the chloroaluminate electrolyte was achieved by electrolytic dissolution of elemental titanium, and the maximum divalent titanium concentration obtained was 0.140 M. The maximum titanium content obtained for deposited titanium-aluminum alloys was 30 atomic percent.

The present invention is a method based on the production of divalent titanium by the reduction of higher valence titanium halides by aluminum in a molten salt electrolyte. The invention avoids the direct addition of costly titanium dichloride and provides an inexpensive, efficient method for introducing divalent titanium into the electrolyte. In addition, the method of the present invention is an improvement over previously known methods since titanium-aluminum alloys containing up to about 50 atomic percent titanium have been obtained at temperatures below 250° C. by the method of the invention.

Accordingly, the invention is a method for preparing a composition comprising trivalent aluminum and divalent titanium, said method comprising heating in an inert atmosphere a mixture comprising (1) at least aluminum halide, (2) elemental aluminum, (3) at least one titanium halide where titanium is in the trivalent or tetravalent state, and (4) at least one salt capable of forming a melt with said aluminum halide at temperatures up to about 250° C. to form a molten homogeneous mass and for a time to effect reduction of said titanium halide by said elemental aluminum.

The temperature of the mixture is held between the melting temperature of the melt composition and 250° C. with 160°-180°C. preferred to allow the following reduction reaction to occur in the melt where, for example, titanium trichloride is the added titanium halide:

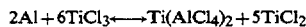

$$2Al + 6TiCl_3 \longleftrightarrow Ti(AlCl_4)_2 + 5TiCl_2$$

The reduction of titanium trichloride to titanium dichloride is indicated qualitatively by a change in color of the melt from violet for the trichloride to a color ranging from green to black for the dichloride depending on the purity and amounts of titanium trichloride used.

Since titanium and its reduced chlorides are highly reactive with oxygen, the melts containing them must necessarily be maintained in an inert atmosphere such as argon or helium. Nitrogen cannot be used because of its high reactivity with aluminum.

The aluminum halide component of the mixture of the invention will typically be aluminum trichloride which has been extensively used to form electrolytes from which aluminum and its alloys can be deposited. Other aluminum halides may be employed so long as the resulting electrolyte remains molten at temperatures up to about 250° C.

The aluminum halide employed in the mixture combines with the salt (component 4) to form a low temperature molten electrolyte. For example, the reaction of aluminum chloride with the chloride ion from said salt produces the electroactive aluminum species $Al_2Cl_7^-$ which is reduced to elemental aluminum for deposition with titanium.

The salt (component 4) may be selected from the group consisting of alkali halides, alkaline earth halides, certain organic halides, and mixtures thereof. NaCl is preferable for use in the chloroaluminate system and has been the salt most commonly employed, but the invention is not limited to its use. Organic halide salts that form low temperature molten electrolytes when combined with the aluminum halide may also be used. Examples include organic imidazolium halides such as 1-methyl-3-ethylimidazolium chloride or bromide which combine with the corresponding aluminum halide to form room temperature molten salt electrolytes possessing relatively high conductivities as compared with other organic electrolytic systems.

Electrodeposition of aluminum and titanium occurs at potentials cathodic to that of the reference electrode which may be, for example, an aluminum wire when the electrolyte is a 2:1 (molar) mixture of AlCl₃ and NaCl. The titanium content of the resulting deposit depends on the amount of divalent chloride produced in the electrolytic solution and, to a lesser extent, the current density. Current densities ranging from 5 to 100 $mA/cm^2$ have been used with slight variations in titanium deposition quality and composition.

The molten salt electrolyte of the invention from which titanium-rich alloys with aluminum may be deposited is comprised preferably of the following:

x g AlCl₃
y g salt (component 4)
z g TiCl₃
n g Al powder where, when component 4 is an alkali metal chloride, x/(x+y)=0.65-0.90 with 0.82 preferred; z/(x+y+z)=0.01-0.85, depending on the desired titanium content; and n/z is at least 0.058. The relationship between the quantities of ingredients added is based on the molar ratios of the following reduction reaction which is believed to occur in the melt:

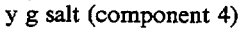

$$2Al + 6TiCl_3 \longleftrightarrow Ti(AlCl_4)_2 + 5TiCl_2$$

Another aspect of this invention is a composition for generating divalent titanium in the molten state, said composition comprising (1) at least one aluminum halide, (2) elemental aluminum, (3) at least titanium halide where titanium is in the trivalent or tetravalent state, and (4) at least one salt capable of forming a melt with said aluminum halide at temperatures up to about 250° C.

The present invention is illustrated by the following examples.

EXAMPLE 1

An electrolyte with a TiCl₃ content of 22% by weight consisting of 103 g AlCl₃, 22.6 g NaCl, 55.5 g TiCl₃ (80% purity assumed), and 2.6 g aluminum powder (325 mesh) was melted in a helium atmosphere in a sealed cell at 170° C. and held at temperature for 88 hours. A tantalum wire was then immersed in the melt as the cathode, and aluminum wires were used as the reference and counter electrodes. The aluminum reference electrode was immersed in a 2:1 AlCl₃:NaCl melt and was separated from the working electrolyte by a

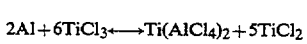

glass frit to avoid interactions between aluminum and divalent titanium. Deposition of aluminum and titanium occurred on the tantalum cathode for three hours at a current density of 34mA/cm$^2$ in the stirred electrolyte.

The deposit was examined by scanning electron microscopy (SEM), and the composition was determined by standardless energy dispersive X-ray spectroscopy (EDXS). The dense nodular deposit had a composition of about 50% Ti/50% Al (atomic percent).

The valence of the titanium in the electrolyte was determined by an electrochemical coulometric procedure in which the salt was added to an $Fe^{+3}$ solution. The titanium reduced $Fe^{+3}$ to $Fe^{+2}$ which was then electrochemically oxidized back to the trivalent state while recording tire coulombs of charge required to do so. From the coulombs used and atomic absorption (AA) analysis of the total titanium content, the apparent valence of the titanium was determined. In this example, the valence was found to be 2.0.

EXAMPLE 2

An electrolyte with a TiCl$_3$ content of 30% by weight consisting of 78.36 g AlCl$_3$, 17.20 g NaCl, 42.00 g TiCl$_3$ and 5.0 g Al powder was melted in a helium atmosphere in a sealed cell at 190° C. and held at temperature for three hours. A tungsten wire was used as the cathode, and aluminum wires were used as the reference and counter electrodes. The reference electrode was immersed in a 2:1 mole ratio AlCl$_3$:NaCl melt and was separated from the working electrolyte by a glass frit. Plating was done on the cathode at 11.5 mA/cm$^2$ at 170° C. until a total charge of about 890 coulombs had been passed.

The deposit was shown by X-ray diffraction (XRD) to be an amorphous material with some elemental aluminum which had been entrained from the melt during deposition. After heat treatment at 700° C. for six hours the deposit was again characterized by XRD and was shown to have converted to a mixture of crystalline Al$_3$Ti and AlTi indicating that the deposit composition was in the range of about 28 to 40 atomic percent titanium. The composition was confirmed by inductively coupled plasma (ICP) analysis which showed a titanium content of approximately 30 atomic percent.

EXAMPLE 3

This example differs from Example 2 only in the deposition current density which was 7 mA/cm$^2$. Again, the deposit was amorphous by XRD. The composition of the deposit was approximately 40 atomic percent titanium by ICP.

EXAMPLE 4

This example illustrates the use of the method of the present invention in a bromide electrolytic solution. Initially, titanium tetrabromide is reduced in situ to titanium tribromide which is then further reduced to produce divalent titanium.

An electrolyte with a TiBr$_4$ content of 20% by weight consisting of 141.41 g AlBr$_3$, 16.59 g NaBr, 40.00 g TiBr$_4$ and 4.00 g Al powder was melted at 1.5 hours at 160° C. and held at 140° C. for 19 hours. Using an electrode arrangement as described in Example 2, deposits were made at 175° C. at current densities of about 15 mA/cm$^2$ and 50 mA/cm$^2$. Both deposits were crystalline supersaturated solutions of titanium in aluminum along with some entrained aluminum powder. ICP analysis provided compositions of 20 atomic percent titanium for the 15 mA/cm$^2$ deposit and 21 atomic percent titanium for the 50 mA/cm$^2$ deposit.

EXAMPLE 5 (Control)

This example illustrates the advantages in using the method of the present invention for the production of divalent titanium over the high temperature method disclosed by Alpert et al. A 50 g total weight charge of material consisting of 56.8% NaCl, 37.4% TiCl$_3$, and 5.8% titanium powder (weight percentages) was heated in a furnace at 670° C. for 20 hours in an argon purged chamber. The holding temperature was well above the melting point of 550° C. for the salt mixture. After cooling, the reaction product was transferred to a helium glove box where samples of the material were taken for analysis. The expected reaction at this temperature is

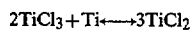

$$2TiCl_3 + Ti \longrightarrow 3TiCl_2$$

Analysis of the reaction product by the aforementioned electrochemical coutombic method yielded an apparent valence of 2.52 for titanium in the melt. Thus, a significant amount of titanium remained in the trivalent state in the melt. Additionally, much of the elemental titanium remained unreacted in the melt as indicated by the insolubility of the reaction product in aqueous media before addition of HF. Thus, the apparent valence of titanium at 2.52 may be artificially low, and the actual value for the average valence of the ionic titanium species may be closer to 3.

The method of the invention was more successful in titanium reduction than the high temperature method of Example 5. Also, the method of this invention is advantageous in that the divalent titanium is produced in situ removing the necessity for a transferral step in the process.

What is claimed is:

1. A method for preparing a composition consisting essentially of trivalent aluminum and divalent titanium, said method comprising heating in an inert atmosphere a mixture comprising (1) at least one aluminum halide, (2) elemental aluminum, (3) at least one titanium halide where titanium is in the trivalent or tetravalent state, and (4) at least one salt capable of forming a melt with said aluminum halide at temperatures up to about 250° C. to form a molten homogeneous mass and for a time to effect reduction of said titanium halide by said elemental aluminum.

2. A method according to claim 1 wherein said heating of said mixture is at a temperature between the melting temperature of said mixture and 250° C.

3. A method according to claim 1 wherein the inert atmosphere is argon or helium.

4. A method according to claim 1 wherein said aluminum halide is aluminum trichloride.

5. A method according to claim 1 wherein said aluminum halide is aluminum tribromide.

6. A method according to claim 1 wherein said titanium halide is titanium trichloride.

7. A method according to claim 1 wherein said titanium halide is titanium tetrabromide.

8. A method according to claim 1 wherein said salt is selected from the group consisting of alkali, alkaline earth, and organic halides.

9. A method according to claim 8 wherein said salt is sodium chloride.

10. A method according to claim 8 wherein said salt is sodium bromide.

11. A method according to claim 8 wherein said salt is an imidazolium salt.

12. A composition for generating divalent titanium in the molten state, said composition comprising (1) at least one aluminum halide, (2) elemental aluminum, (3) at least one titanium halide where titanium is in the trivalent or tetravalent state, and (4) at least one salt capable of forming a melt with said aluminum halide at temperatures up to about 250° C.

13. A composition for generating divalent titanium according to claim 12 wherein said aluminum halide is aluminum trichloride.

14. A composition for generating divalent titanium according to claim 12 wherein said aluminum halide is aluminum tribromide.

15. A composition for generating divalent titanium according to claim 12 wherein said titanium halide is titanium trichloride.

16. A composition for generating divalent titanium according to claim 12 wherein said titanium halide is titanium tetrabromide.

17. A composition for generating divalent titanium according to claim 12 wherein said salt is selected from the group consisting of alkali, alkaline earth and organic halides.

18. A composition for generating divalent titanium according to claim 17 wherein said salt is sodium chloride.

19. A composition for generating divalent titanium according to claim 17 wherein said salt is sodium bromide.

20. A composition for generating divalent titanium according to claim 17 wherein said salt is an imidazolium salt.

* * * * *